(12) United States Patent
Weir

(10) Patent No.: US 7,143,805 B1
(45) Date of Patent: Dec. 5, 2006

(54) SUNSCREEN

(76) Inventor: Dennis E. Weir, 12424 N. 56th Dr., Glendale, AZ (US) 85304

( * ) Notice: Subject to any disclaimer, the term of this patent is extended or adjusted under 35 U.S.C. 154(b) by 100 days.

(21) Appl. No.: 10/952,080

(22) Filed: Sep. 28, 2004

(51) Int. Cl.
*B60J 1/04* (2006.01)

(52) U.S. Cl. .............................. 160/370.22; 160/323.1; 160/903

(58) Field of Classification Search ............ 160/323.1, 160/370.22, 903; 248/269, 270, 271, 272; 296/97.7, 97.8
See application file for complete search history.

(56) References Cited

U.S. PATENT DOCUMENTS

| | | | | |
|---|---|---|---|---|
| 2,594,386 A | * | 4/1952 | Blessen | 296/97.7 |
| 4,729,418 A | * | 3/1988 | Rude | 160/323.1 |
| 4,762,358 A | | 8/1988 | Levosky et al. | 296/97 G |
| 5,450,891 A | * | 9/1995 | Benthin | 160/323.1 |
| 5,495,884 A | * | 3/1996 | Shikler | 160/120 |
| 5,881,792 A | * | 3/1999 | Cheng | 160/263 |
| 6,039,107 A | * | 3/2000 | Pittard | 160/370.22 |
| 6,079,683 A | * | 6/2000 | Lin | 248/292.12 |
| 6,322,032 B1 | | 11/2001 | Su | 248/292.12 |
| 6,763,874 B1 | * | 7/2004 | Chen | 160/370.22 |

* cited by examiner

*Primary Examiner*—David Purol
(74) *Attorney, Agent, or Firm*—Cahill, von Hellens & Glazer P.L.C.

(57) ABSTRACT

In an adjustable mounting system for a sunscreen a cap on one end of a housing for the screen has a pivot stud that is received in a bearing opening in a post hingedly connected to base. The hinge connection is preferably provided by a cylindrical keyway and cylindrical key combination.

9 Claims, 4 Drawing Sheets

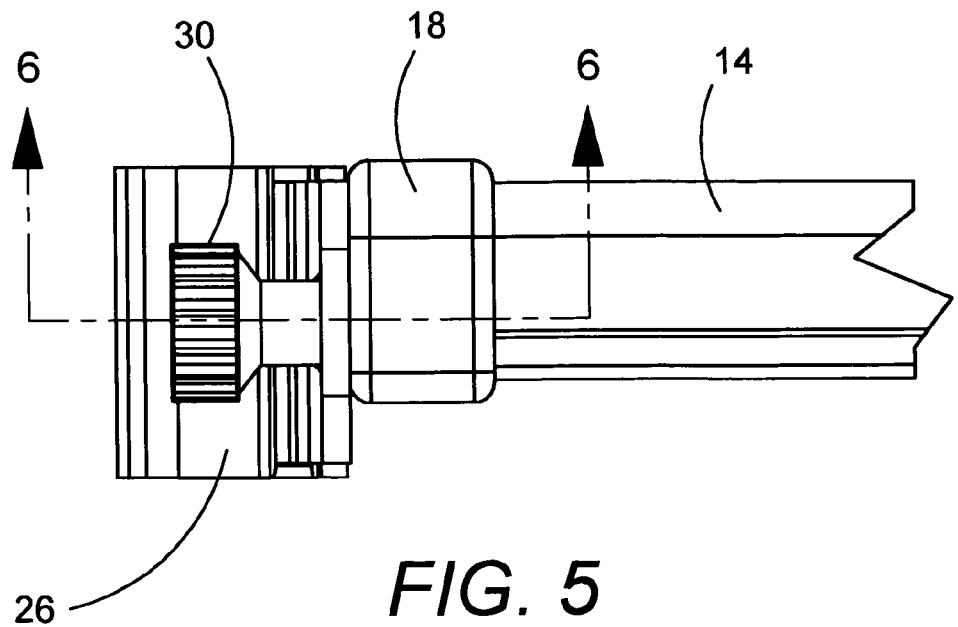
FIG. 5
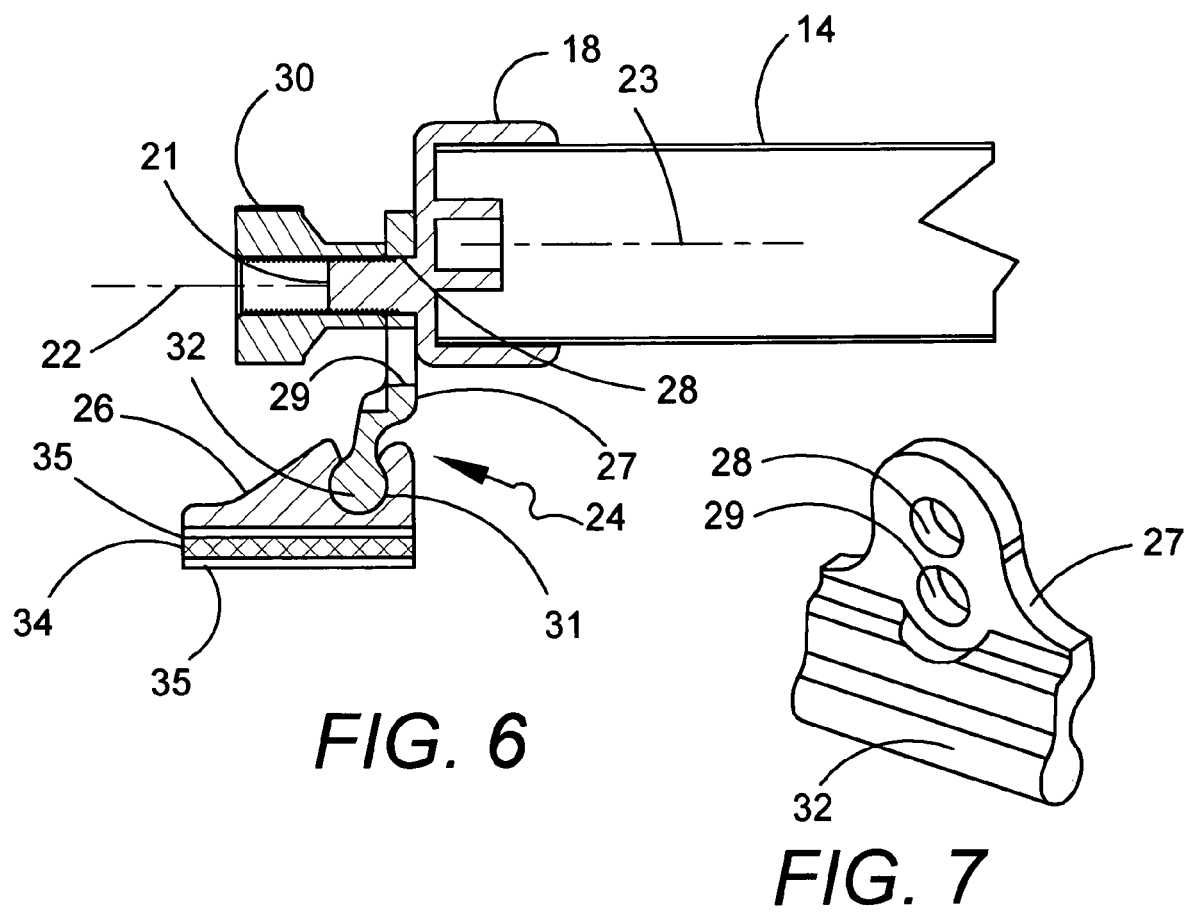
FIG. 6
FIG. 7

SUNSCREEN

TECHNICAL FIELD

This invention pertains to sunscreens of the class commonly employed to reduce the effect of sunlight on the occupants of automotive vehicles.

BACKGROUND ART

It has been common practice to erect sunscreens inside windows of a motor vehicle to reduce the glare and heat from sunlight. Many of the prior art sunscreens included adjustable mounting systems to accommodate different glass and glass frame configurations for different vehicles.

Representative of this class of sunscreens are those disclosed in U.S. Pat. No. 4,762,358 granted Aug. 9, 1988 to John M. Levosky et al. for "Automotive Sun Screen" and U.S. Pat. No. 6,322,032 granted Nov. 27, 2001 to Shu-Chen Su for "Base Assembly for a Windshield Sunshade of an Automobile".

The Levosky et al. sunscreen is adapted for mounting on windshields of different curvatures, but is not adapted to automotive dash mounting. The Shu-Chen Su offers a fairly complex adjustable dash mounting system not suitable for mounting on a windshield or window glass.

There continues to be a need for a sunscreen mounting which is simple, easy to install and which has the adaptability to be mounted on the glass or on a frame or dash.

SUMMARY OF THE INVENTION

This invention contemplates mounting the sunscreen from a cap for one end of an elongated housing in which the screen is stored in a roll about an axis of the housing. A pivot stud projecting from the cap longitudinally of the housing is displaced from the axis of the housing. A mount having a face adapted to be secured either to glass or a frame has at least one bearing opening in a post portion thereof for receiving the pivot stud for rotation therein. Rotation of the stud and the housing to which it is affixed permits the housing to be moved toward or away from the glass as desired. The post of the mount may have a plurality of bearing openings therein into which the pivot stud can be selectively placed for further adjustment of the position of the housing.

A further adjustment feature of the invention is provided by including a hinge coupling between the post and a base making up the mount. The coupling preferably takes the form of a cylindrical keyway in one member and a cylindrical key in the other member.

BRIEF DESCRIPTION OF THE DRAWINGS

The invention is described in greater detail hereafter by reference to the accompanying drawings wherein:

FIG. 5 is a plan view of the mounting system;

FIG. 6 is a sectional view of the mounting system taken as indicated by the line 6—6 in FIG. 5; and FIG. 7 is a perspective view of a post component of the mounting system.

BEST MODES FOR CARRYING OUT THE INVENTION

Figure 1:
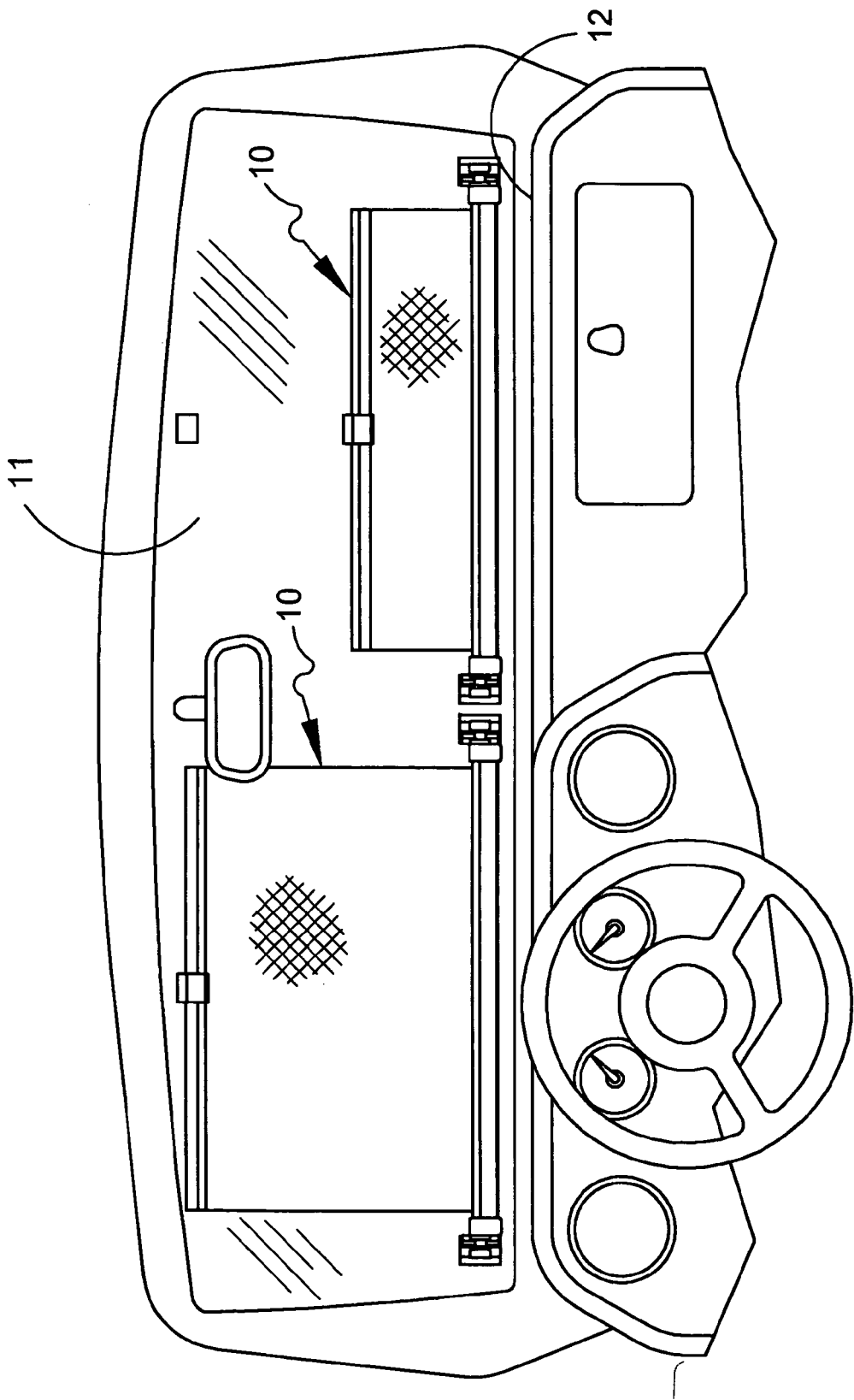
FIG. 1 is a partial elevational view from the interior of a motor vehicle showing the dash and two sunscreens of this invention mounted on the inside of the windshield

Referring to FIG. 1, the reference numeral 10 identifies generally the sunscreen of this invention two of which are mounted on the inner surface of the windshield 11 above the dash 12 of a motor vehicle. It is to be understood that this is but one preferred location for the sunscreen. Other, equally, preferred locations are side and rear windows of vehicles.

Figure 2:
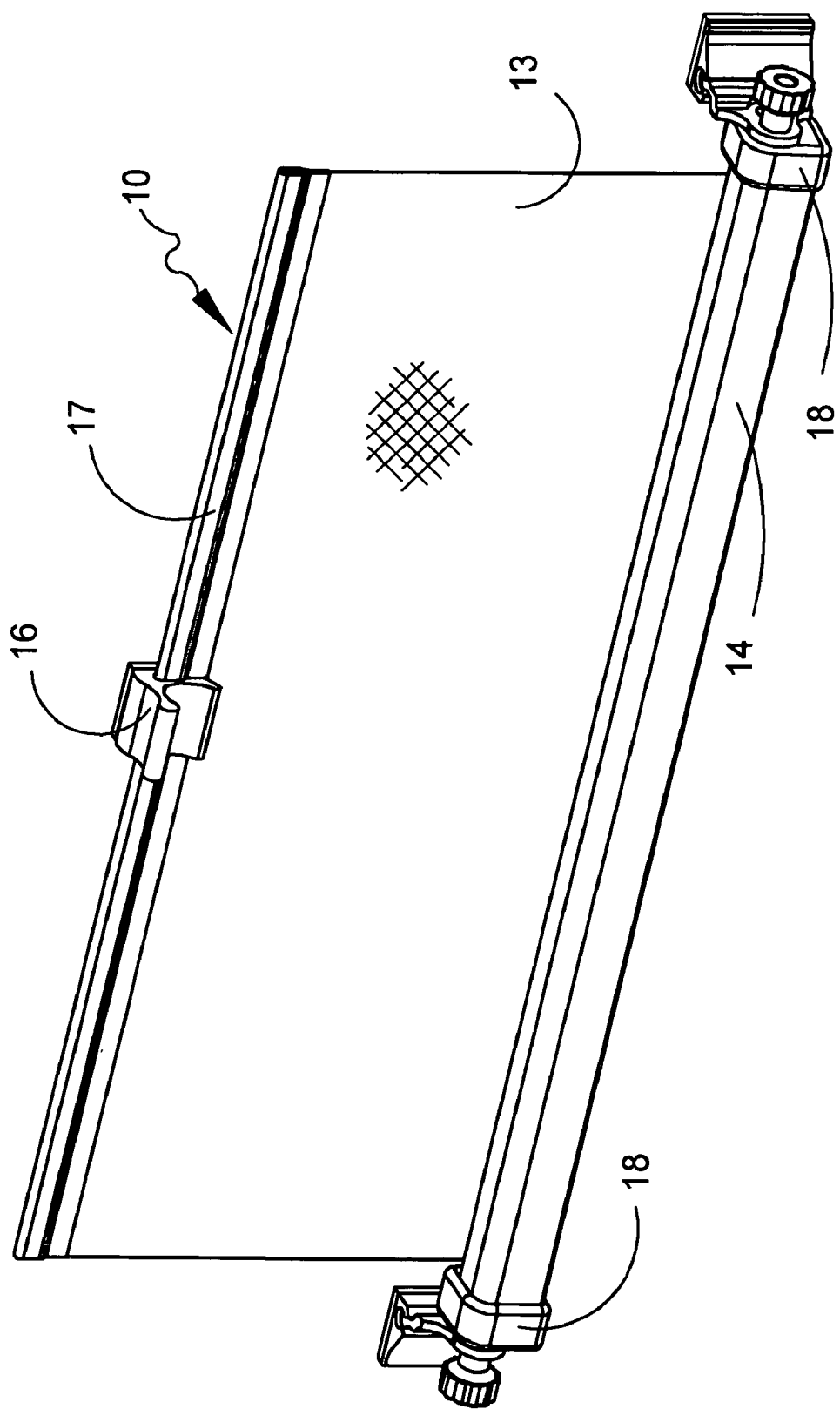
FIG. 2 is an enlarged perspective view of one of the sunscreens of FIG. 1.

Referring to FIG. 2, among the principal components of the sunscreen 10 are the screen itself 13, a flexible open weave fabric capable of filtering the suns rays without totally obscuring one's view through the screen. When not in use the screen 13 is stored in a rolled up condition within an elongated housing 14. For use screen 13 is withdrawn from housing 14 by means of a handle 16 affixed to a light metal stiffening flange 17 secured to the free edge of the screen. Any suitable means may be employed for holding the screen 13 in its extended, in-use, position.

Details of the adjustable mounting system of the invention are best illustrated in FIGS. 3–6. This system includes a cap 18 formed to snugly encase an end of the housing 14 and to be held in place by a screw 19. Extending longitudinally of the housing 14 and outwardly from cap 18 is a threaded pivot stud 21 (FIG. 6). It is to be noted that the axis of the pivot stud 21 (indicated by line 22) and the axis of housing 14 about which screen is rolled (indicated by line 23) are displaced from one another. As a consequence, rotation of cap 18 about stud 21 results in lateral displacement of the housing 14 for adjusting the position of the housing.

Cap 18 is connected to a surface (glass or a surrounding frame or dash) by a mount 24 comprised of a base 26 and a post 27. Post 27 has at least one bearing opening 28 therein for receiving pivot stud 21 on cap 18. Post 27 may also have more than one bearing opening 29 constituting a plurality of openings (See FIG. 7) allowing the pivot stud 21 to be selectively placed in one of such openings for further adjustable placement of housing 14.

When the desired placement of the stud 21 with regard to post 27 is achieved the cap 18 and post 27 are locked together by tightening finger nut 30 on post 27.

In accordance with the invention post 27 and base 26 of mount 24 are hingedly coupled. This coupling is preferably provided in the form of a cylindrical keyway 31 on one member (the base as shown) and a cylindrical key 32 on the other member (the post as shown). The purpose of the hinge coupling of the base 26 to the post 27 is to permit the base to tilt to accommodate a curvature in a windshield when the sunscreen is mounted as shown in FIG. 1 or to accommodate a sloping dash 12 when mounted as shown in FIG. 4.

Figure 3:
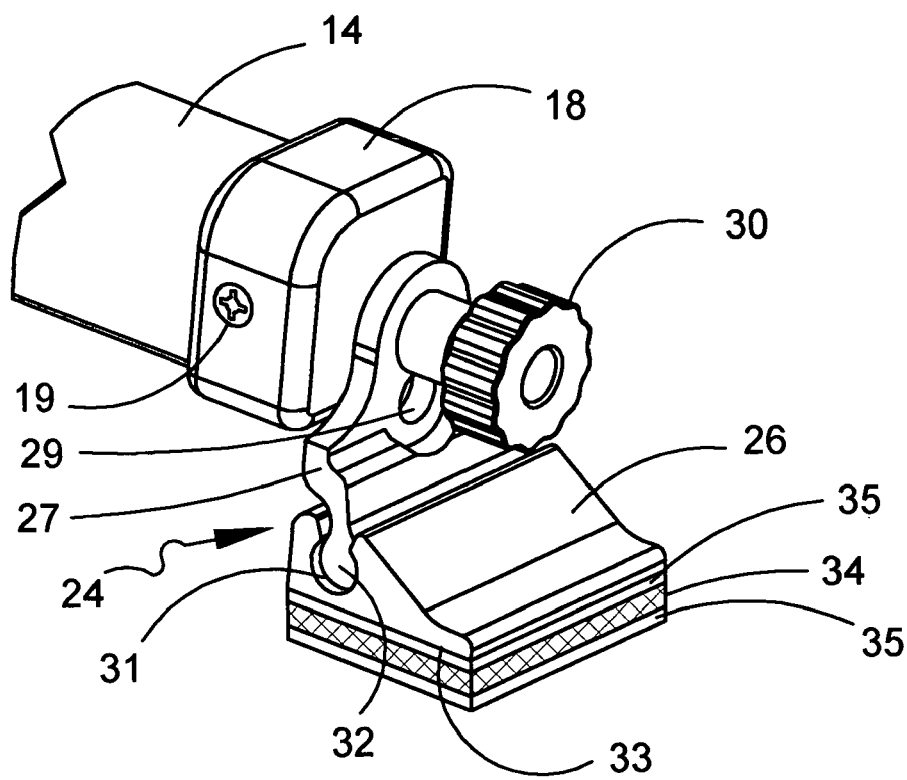
FIG. 3 is a further enlarged perspective view of the mounting system at one end of the housing for the sunscreen.
Figure 4:
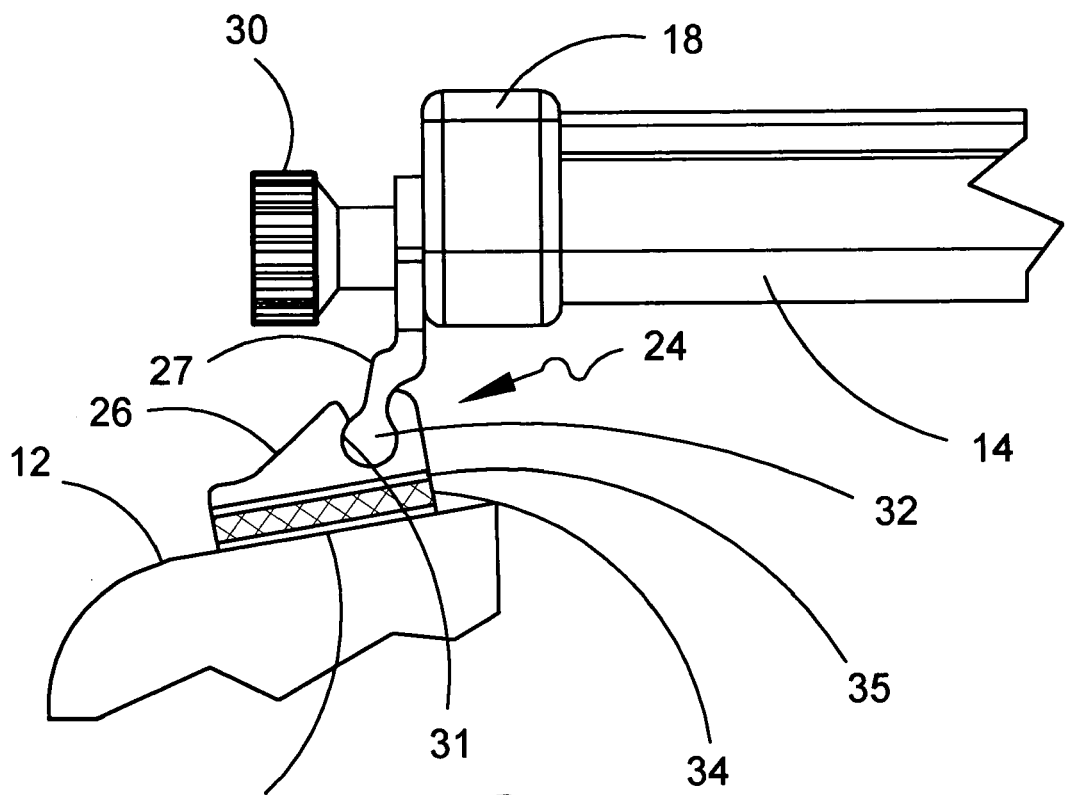
FIG. 4 is an elevational view of the mounting system applied to a sloping surface such as a dash.

Although the base member 26 can be secured in a variety of ways to a mounting surface, the preferred arrangement is that shown in FIGS. 3, 4 and 6. As shown there the lower face 33 of base 26 has applied thereto a sandwich of a hook and loop fabric fastener 34 faced with layers of self adhesive 35.

From the foregoing it should be apparent that this invention provides a simple, easily installed mounting system for the sunscreen 10. The principal components of the system, namely the cap 18, the post 27 and the base 26, can be economically produced by injection molding from plastic materials. One such material particularly suited for this purpose is a polycarbonate plastic sold by General Electric Plastics under the brand name Lexan®. That material is easily molded to precision configurations with sufficient strength with some flexibility to function in the mounting system of this invention. For example, the coupling between the base 26 and the post 27 can be precision molded to provide for, say, 0.001 inch interference between the key 32 and the keyway 31 to permit relative movement between the components but with sufficient frictional engagement to retain the components in the desired positions when set.

What is claimed is:

1. An adjustable mounting system for a sunscreen, said system comprising:
    an elongated housing wherein the sunscreen can be stored in a roll about an axis of the housing, said housing having opposite ends,
    a cap for an end of the housing,
    a pivot stud projecting from the cap longitudinally of the housing, said pivot stud being displaced from the axis of the housing, and
    a mount having a face adapted to be secured to a surface, said mount further comprising a post having a bearing opening therein for receiving the pivot stud on said cap and permitting rotation of said pivot stud in the bearing opening.

2. The mounting system of claim 1 wherein the post of said mount has a plurality of bearing openings therein.

3. An adjustable mounting system for a sunscreen, said system comprising:
    an elongated housing wherein the sunscreen can be stored in a roll,
    a cap for an end of the housing;
    a pivot stud projecting from the cap longitudinally of the housing,
    a post having a bearing opening therein for receiving the pivot stud on said cap,
    a base, and
    means for hingedly coupling said base to said post, said coupling means comprising:
        a cylindrical keyway in one of said post and said base and
        a cylindrical key on the other of said post and said base.

4. The mounting system of claim 3 wherein the post has a plurality of bearing openings therein.

5. The mounting system of claim 3 wherein said key is frictionally engaged in said keyway.

6. An adjustable mounting system for a sunscreen, said system comprising:
    an elongated housing wherein the sunscreen can be stored in a roll about an axis of the housing, said housing having opposite ends,
    a cap for an end of the housing,
    a pivot stud projecting from the cap longitudinally of the housing, said pivot stud being displaced from the axis of the housing, and
    a mount having a face adapted to be secured to a surface, said mount further comprising:
        a post having a bearing opening therein for receiving the pivot stud on said cap and permitting rotation of said pivot stud in the bearing opening,
        a base providing said face, and
        means for hingedly coupling the base to said post.

7. The mounting system of claim 6 wherein the post of said mount has a plurality of bearing openings therein.

8. The mounting system of claim 6 wherein the coupling means in said mount comprises:
    a cylindrical keyway in one of said post or said base, and
    a cylindrical key on the other of said post or said base functionally engaged in said keyway.

9. The mounting system of claim 8 wherein the post of said mount has a plurality of bearing openings therein.

* * * * *